United States Patent [19]

Okamoto

[11] Patent Number: 5,597,968
[45] Date of Patent: Jan. 28, 1997

[54] PERCUSSION MUSIC TEACHING METHOD

[76] Inventor: Eric Okamoto, 1300 Salterton Ct., Raleigh, N.C. 27608

[21] Appl. No.: 354,224

[22] Filed: Dec. 12, 1994

[51] Int. Cl.⁶ .................................................. G09B 15/00
[52] U.S. Cl. .................. 84/470 R; 84/471 R; 84/477 R; 84/483.1
[58] Field of Search ............................ 84/470 R, 471 R, 84/477 R, 483.1, 483.2, 484; 434/365, 367, 428, 430

[56] References Cited

U.S. PATENT DOCUMENTS 2,385,093  9/1945  Marsh.
3,247,751  4/1966  Leonard.
4,434,698  3/1984  Oberlander.

Primary Examiner—Cassandra C. Spyrou
Attorney, Agent, or Firm—Mills & Associates

[57] ABSTRACT

The invention is a music teaching method designed for the student of non-pitched percussion instruments incorporating two major components. First, a limited selection of basic percussion exercises and variations written for one or more percussion instruments is printed on opaque music manuscript paper or other music display media. Finally, a series of overlays including preprinted, complimentary percussion music exercises is provided for use in combination with the aforementioned basic percussion exercises. The overlays may be alternately superimposed in a functional relationship with the basic percussion exercises to create hybrid percussion exercises having adequate visual representation of the repetitive rhythmic patterns inherent in percussion music. Thus, an exhaustive collection of percussion exercises may be provided in a reasonably sized volume, reducing the cost of a more cumbersome printed volume that would be impracticable to publish and market.

8 Claims, 9 Drawing Sheets

PERCUSSION MUSIC TEACHING METHOD

FIELD OF INVENTION

This invention relates to music teaching methods and more particularly to music teaching methods designed for the student of non-pitched percussion instruments.

BACKGROUND OF INVENTION

It is already a well known practice to utilize transparent overlays designed to aid the student musician in learning the complexities of the tonal aspects of music; however, the prior art in this field cannot be utilized by the non-pitched percussion instruments, which do not use the tonal aspects of music.

A separate system of musical notation for the percussion instruments has evolved through the centuries that is unique to non-pitched instruments. Percussion music is written without reference to tonality or key signature, or if reference to key signature is included, it is made for the percussionist's general information and does not affect his performance of the music.

The repetitive nature of percussion music, and the acquisition of complex coordination skills create a challenge for the teacher of percussion material. Limitations inherent in standard percussion books do not allow adequate visual representation of the repetitious rhythmic patterns inherent in percussion music. Educators of percussion students have long dealt with the difficulties that arise when books do not contain adequate visual representation of the music to be learned. Typically, the student is required to memorize a given rhythm and play it, while reading a complimentary rhythm under study and performing it at the same time. This is obviously frustrating for the student. The alternative would be a cumbersome volume filled with repetition, but impractical to publish and market.

CONCISE EXPLANATION OF PRIOR ART

U.S. Pat. No. 1,354,214 to Robert B. Robinson utilizes a transparent overlay imposed upon a nontransparent sheet to enable the user to transpose musical compositions from one key signature to another.

U.S. Pat. No. 2,516,485 to Margaret M. Rogers discloses a musical note finder including a transparent template for use in conjunction with sheet music and designed to enable the user to find the letter names of standard musical notes printed on the sheet music.

U.S. Pat. No. 4,434,698 to Charles N. Oberlander discloses a system for devising a sheet of music and for transposing the music from one key to another. A layer of opaque material having standard music indicia disposed thereon is interposed typically between a first and second overlay of transparent material which includes additional musical indicia. Cooperating indicia in the opaque layer and transparent overlays permit alignment of the two for a desired key.

U.S. Pat. No. 4,464,971 to Leslie A. Dean discloses a musical education display apparatus for musical instruction or composition, which includes one or more transparent overlays to permit sequential construction and display of supplementary musical notation indicia in combination with the indicia already appearing on the display board as it shows through the transparent overlay.

U.S. Pat. No. 4,969,383 to Robert A. Bezeau discloses a musical scale indicator including a slidable, clear overlay which has printed thereon musical notes being visually associated with the finger boards used to play selected musical instruments.

Finally, U.S. Pat. No. 5,254,008 to Beverley G. Dawson discloses a simple teaching kit with a plurality of transparent overlays upon which the student electively affixes a plurality of colored stickers representing any selected scale, tonal pattern, or chord pattern in any selected key.

BRIEF DESCRIPTION OF INVENTION

After much research and study into the above mentioned problems, the present invention has been developed to provide a music teaching method specifically designed for the student of non-pitched percussion instruments which can be incorporated into a volume of reasonable size.

The method of teaching percussion music of the present invention incorporates two major components. First, a limited selection of basic percussion exercises and variations composed for one or more percussion instruments are printed on opaque music manuscript paper or other music display media. These basic percussion exercises include variations among the three basic categories of non-pitched percussion instruments namely, bass drum, snare drum, and cymbals.

Finally, a series of transparent overlays including pre-printed complimentary percussion music exercises composed for one or more different percussion instruments is provided for use in combination with the aforementioned basic percussion exercises.

The transparent overlays included with the present invention may be alternately superimposed on the basic percussion exercises to create hybrid percussion exercises having adequate visual representation of the repetitive rhythmic pattern to be practiced by the student.

By transferring the series of transparent overlays from one basic exercise to another, each individual exercise is effectively multiplied by a factor of the number of overlays. Thus, an exhaustive collection of percussion exercises, allowing adequate visual representation of the repetitious patterns inherent in percussion music, may be provided in a reasonably sized volume, thereby reducing the cost of a more cumbersome, printed volume impractical to publish and market.

Further, the transparent overlays may be marked on, as with a felt pen at the discretion of the teacher or student, as is well known in the prior art. In this way additional dynamic markings or accents, in combination with the indicia already appearing on the transparent overlays, may be used to enhance the teaching process.

In view of the above, it is an object of the present invention to provide a comprehensive collection of percussion music exercises for the student, having adequate visual representation of the repetitious patterns inherent in percussion music, which is reasonable in size by the use of a series of transparent overlays including complimentary percussion music indicia.

Another object of the present invention is to provide a series of transparent overlays designed to function in combination with a set of basic percussion exercises printed on opaque music manuscript paper or other music display media to generate multiple variations of each basic percussion exercise.

Another object of the present invention is to provide a cost effective method of teaching percussion music by reducing the amount of music manuscript paper that would be required if the same percussion exercises were to be printed on standard music paper without overlays.

Another object of the present invention is to provide percussion musical indicia preprinted on transparent overlays to be practiced by the student in conjunction with a set of basic percussion exercises printed on opaque music manuscript paper or other music display media, creating for the student percussionist a devised sequence of hybrid percussion exercises with variations.

Another object of the present invention is to enable the student or teacher of this percussion music method to customize the materials according to the students needs by marking on the transparent overlays with a felt tipped pen at their discretion.

Other objects and advantages of the present invention will become apparent and obvious from a study of the following description and the accompanying drawings which are merely illustrative of such invention.

DETAILED DESCRIPTION OF INVENTION

Figure 1:
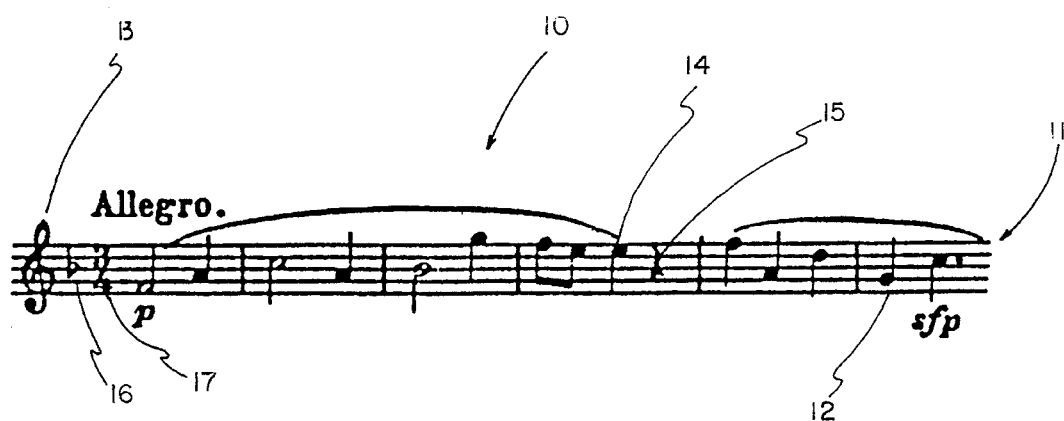
FIG. 1 is a top plan view of a line of standard musical notation for pitched instruments.

As background and to better understand by comparison the percussion music teaching method of the present invention, reference should be made to FIG. 1 which designates an excerpt of standard musical notation, indicated generally at 10, for pitched instruments such as piano, violin, and guitar. Staff indicia means, indicated generally at 11, include a plurality of staff lines such as staff line 12 and has printed thereon, clef indicia 13 which particularly identifies the treble clef. Musical notation indicia such as indicia 14 and 15 are shown in position on staff indicia 11. Staff indicia 11 also has printed thereon key signature indicia 16, which particularly identifies the tonality of the musical composition, and time indicator indicia 17, which particularly identifies the rhythmic pattern of the musical composition.

Figure 2:
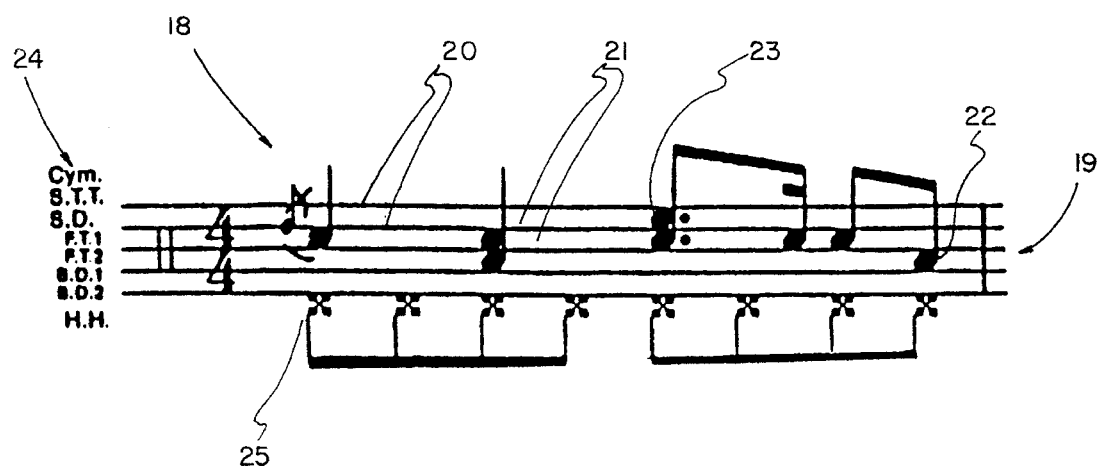
FIG. 2 is a top plan view of a line of standard musical notation for percussion instruments.

It will be appreciated by referring to FIG. 2, that standard percussion music notation, indicated generally at 18, is written without reference to tonality or key signature, or if reference to key signature is included, it is made for the percussionist's general information and does not affect his performance of the music. Thus, staff indicia indicated generally at 19, does not have printed thereon the customary clef indicia 13, as shown in FIG. 1, or the key signature indicia 16, as shown in FIG. 1, associated with the music performed by pitched instruments.

In percussion music notation, the staff lines 20 and spaces 21 represent, not pitches, but different percussion instruments. Still referring to FIG. 2, it will be seen that percussion music notation 18 includes a list of the percussion instruments in abbreviated form, indicated generally at 24, which correspond to the staff lines 20 and spaces 21 included within staff indicia 19.

For example, as shown in FIG. 2, musical indicium 22, indicates a rhythmic accent or beat to be played on a bass drum with a foot pedal. It will be appreciated that the abbreviation B.D.1 included within list 24 corresponds with a space 21 within staff indicia 19 whereon musical indicium 22 is printed. Similarly, musical indicium 23 indicates a rhythmic beat to be played by snare drum. It will also be appreciated that the abbreviation S.D. corresponds to a space 21 within staff indicia 19 whereon musical indicium 23 is printed.

In like fashion, musical indicium 25 indicates the rhythmic beat to be maintained by a high-hat cymbal with a foot pedal throughout the musical composition. Again, it will be appreciated that the abbreviation H.H. contained within the list 24 corresponds to a space 21 within staff indicia 19 whereon musical indicium 25 is printed. The indicium notation comprising musical indicium 25 further emphasizes that the rhythmic pattern is to be performed by a non-pitched percussion instrument, namely the high-hat cymbal.

The standard percussion notation 18 by itself forms no part of the invention but is necessarily shown to enable the reader to understand the present invention and the mode of operation of same. Further, it becomes clear that the prior art pertaining to music teaching methods has not been designed for percussionists.

The percussion music teaching method of the present invention incorporates two major components. First, a selection of basic percussion exercises compiled for the student percussionist are printed on opaque music manuscript paper or other music display media. An excerpt from a representative sample of a basic exercise in standard percussion notation is illustrated in FIG. 3, indicated generally at 26.

Figure 3:
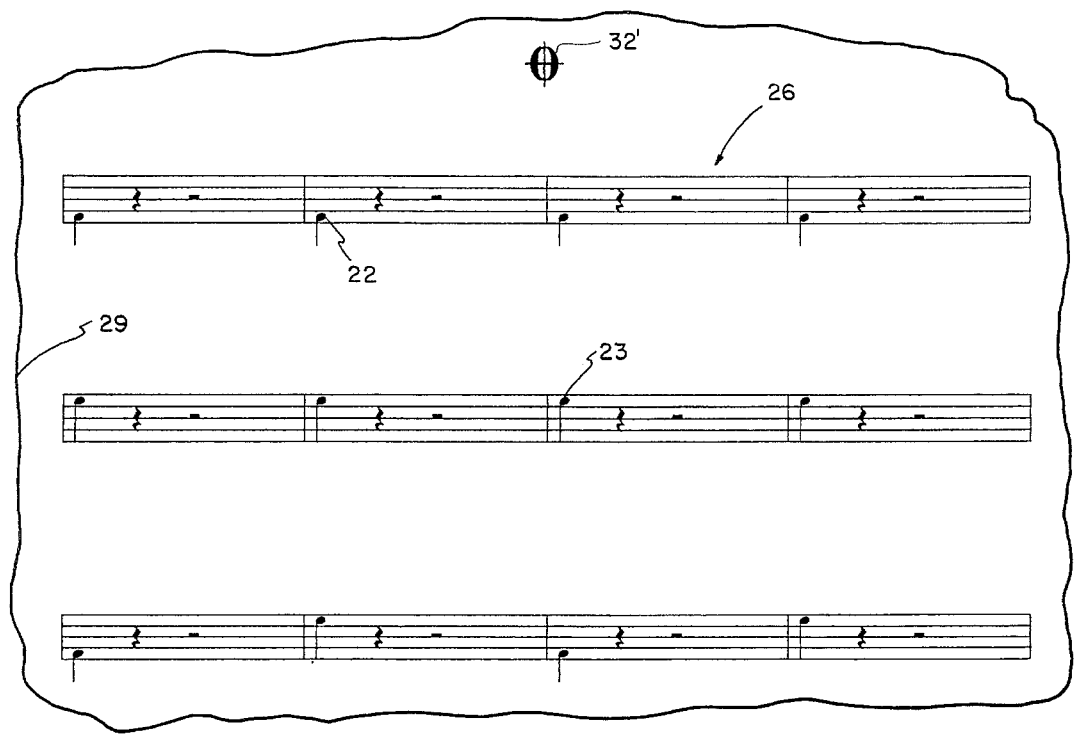
FIG. 3 ms a top plan view of an embodiment of a basic percussion music exercise devised for the present invention.

It will be appreciated that the prior description of standard percussion music notation relating to FIG. 2 is entirely applicable to percussion exercise 26 as illustrated in FIG. 3, and that the abbreviated list 24 of percussion instrument names is omitted merely for convenience in FIG. 3, as is customary.

Figure 4:
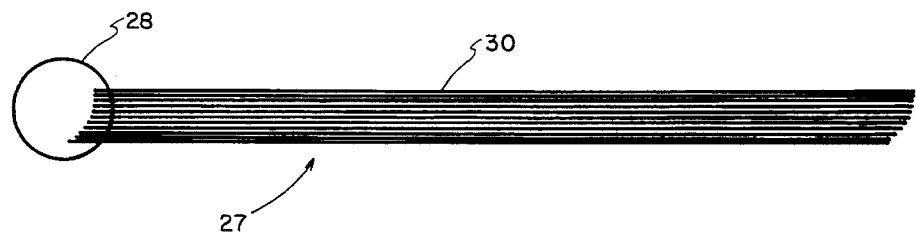
FIG. 4 is an elevational view of an embodiment of a typical volume of percussion exercises of the present invention.

As shown in FIG. 4, percussion exercises 26 may be compiled into a volume, indicated generally at 27, and placed in a suitable binder 28 which are well known to those skilled in the art and further detailed discussion of the same is deemed unnecessary. Volume 27 will typically number about 200 pages, and exercises 26 may be printed on both sides of a single page.

The initial pages will include the least complex of rhythms and each subsequent page will increase in complexity or variation. Percussion exercises 26 include variations among the three basic categories of non-pitched percussion instruments namely, bass drum, snare drum, and cymbals.

Still referring to FIG. 4 a series of transparent overlays 30 including preprinted percussion music indicia 31 are provided for use in combination with the aforementioned basic percussion exercises 26 printed on the opaque music manuscript paper 29 or other music display media.

Figure 5:
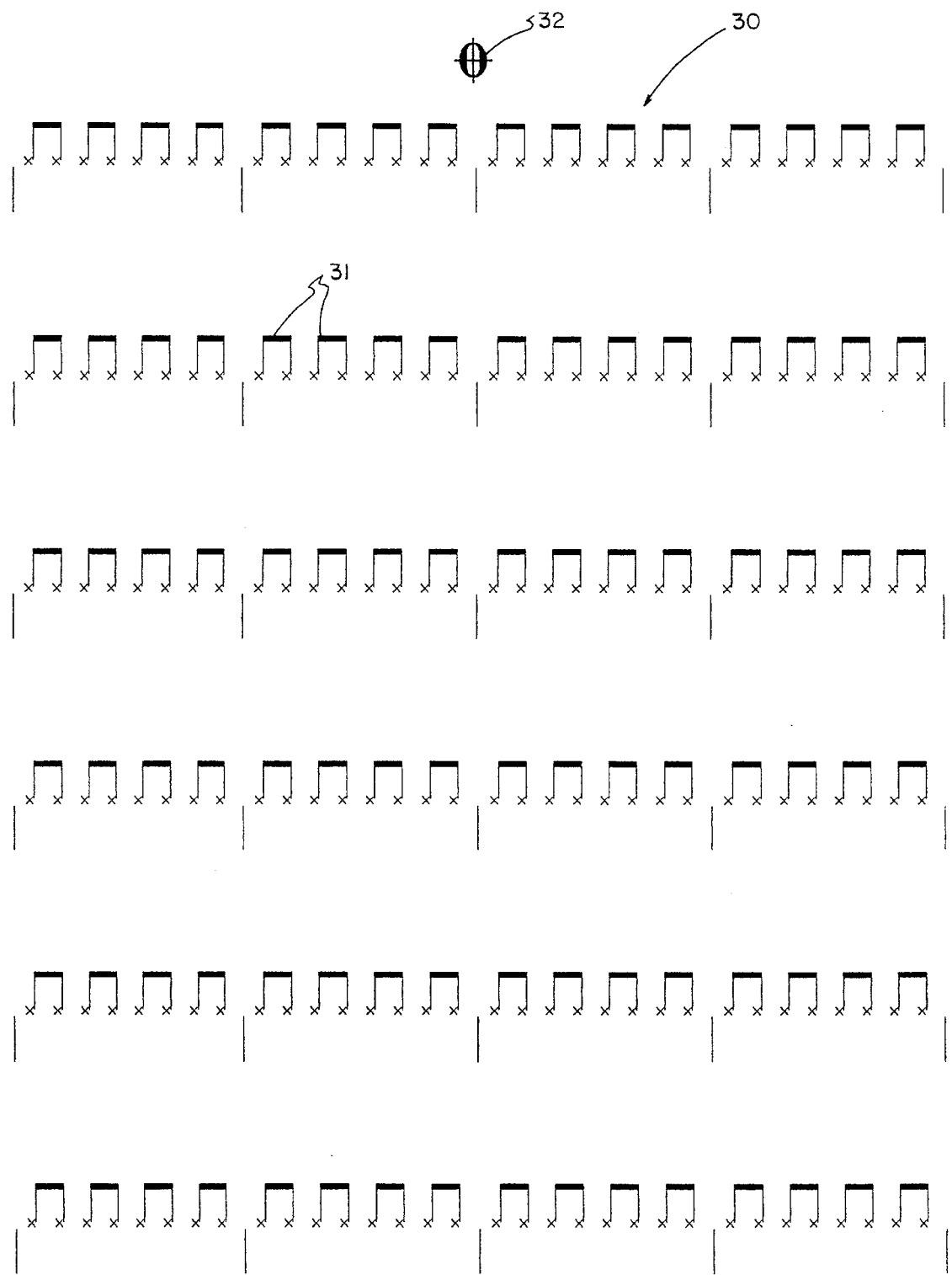
FIG. 5 is a top plan view of a first transparent overlay including percussion music indicia of the present invention.

A representative example of a transparent overlay 30 including preprinted percussion music indicia 31 is illustrated in FIG. 5. Transparent overlays 30 may also be provided with a preprinted locating mark 32, as shown in FIG. 5, for alignment with an identical preprinted locating mark 32' on percussion exercises 26, as shown in FIG. 3, so as to insure accurate alignment of the complimentary materials to be practiced.

Figure 6:
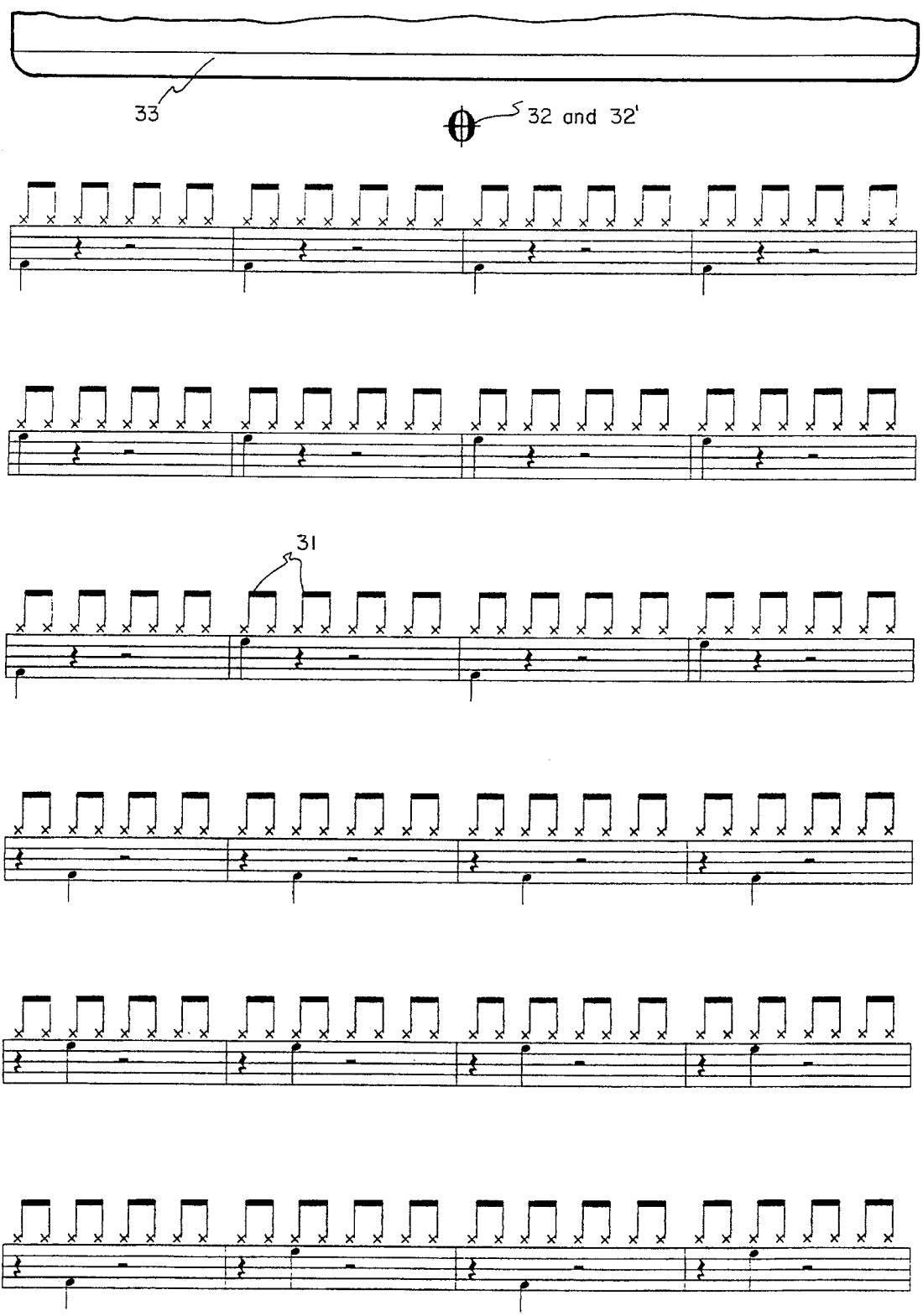
FIG. 6 is a top plan view of a first transparent overlay as shown in FIG. 5 superimposed upon the opaque sheet of the basic percussion exercise of FIG. 3.

Transparent overlay 30 may be retained in alignment by the use of a simple retaining device 33 such as an ordinary paper clip or other similar device as shown in FIG. 6, without damage to the materials. Such retaining devices are well known to those skilled in the art and further detailed discussion of the same is deemed unnecessary.

FIG. 6 illustrates the transparent overlay 30 of FIG. 5 superimposed upon the basic percussion exercise 26 as shown in FIG. 3, expanded to its complete form on a full page.

It will be appreciated that with locating marks 32 of transparent overlay 30 and locating mark 32' of percussion exercise 26 in substantial alignment, the percussion music indicia 31 of transparent overlay 30 appear in complimentary relation to basic percussion exercise 26. Thus, the student percussionist is provided with a hybrid percussion exercise having a rhythmic beat on the transparent overlay 30 to be maintained by the cymbals, in this instance, while simultaneously performing the rhythmic beat to be played on the bass drum and the snare drum as specified in basic percussion exercise 26.

Figure 7:
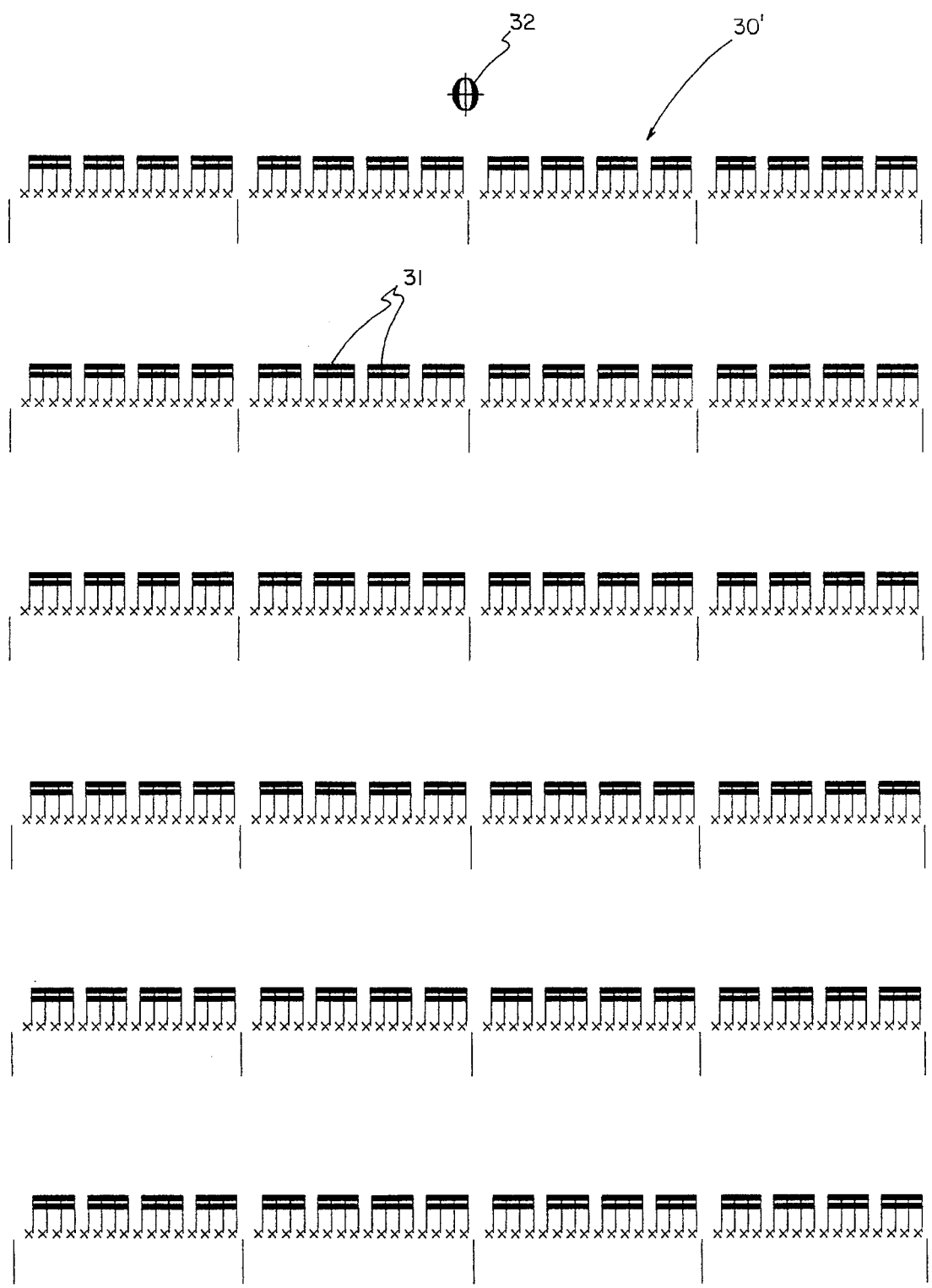
FIG. 7 is a top plan view of a second transparent overlay including percussion music indicia of the present invention.
Figure 8:
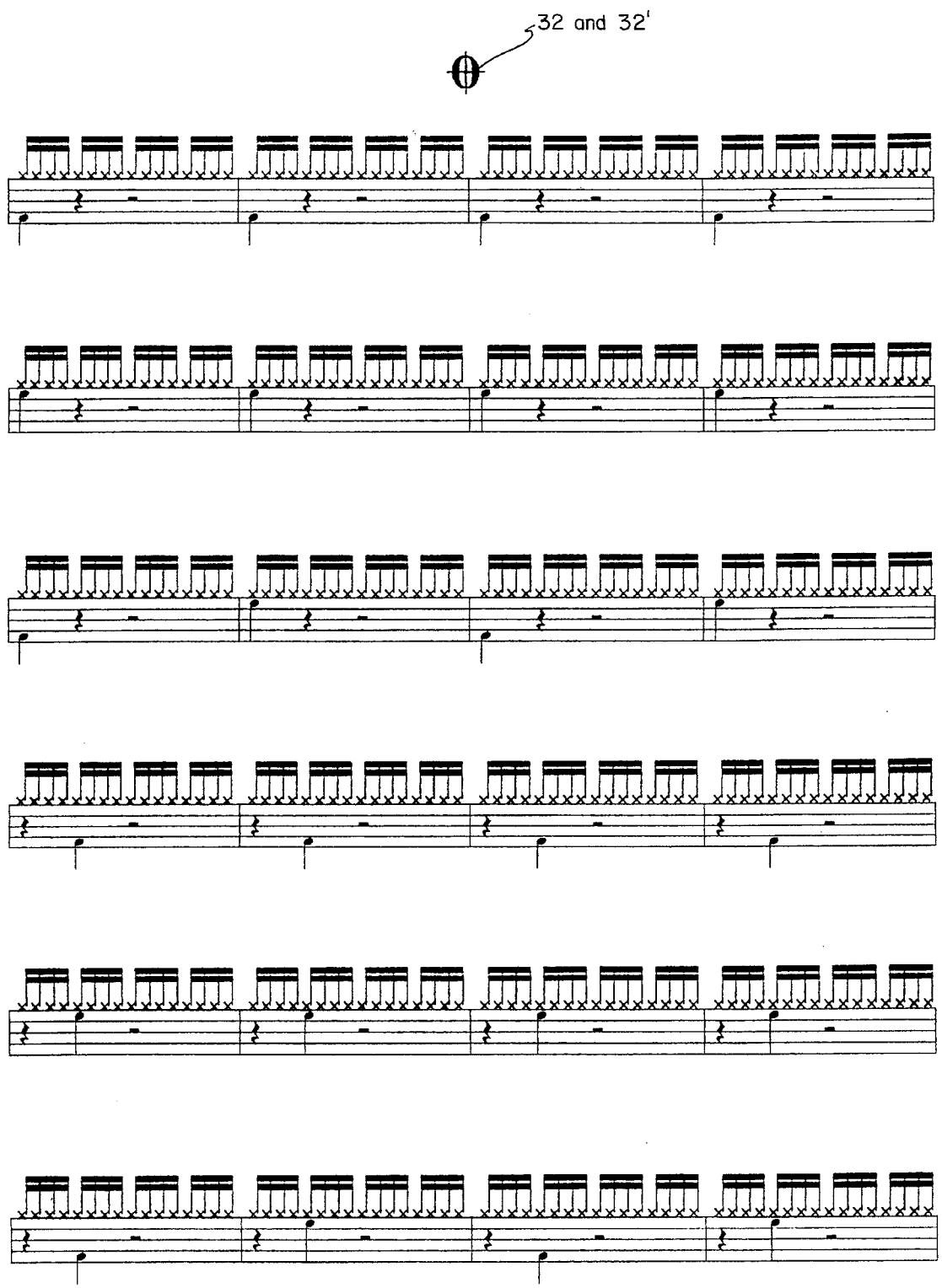
FIG. 8 is a top plan view of the second transparent overlay of FIG. 7 superimposed upon the opaque sheet of the basic percussion exercise of FIG. 3.

Similarly, as shown in FIG. 7, a second transparent overlay indicated generally at 30', including preprinted percussion music indicia 31 of a somewhat more complex nature than that which was contained in the first transparent overlay 30, may be superimposed upon the percussion exercise 26 of FIG. 3, as illustrated in FIG. 8.

It will be appreciated that the student percussionist may progress in a devised sequence through the entire series of transparent overlays 30, each including a rhythmic pattern of a different level of complexity or including a variation of a previously studied rhythmic pattern.

As the student percussionist progresses in his study of basic percussion exercises 26 it will be seen that the same series of transparent overlays 30 may again be superimposed upon the more advanced basic exercises to create new, increasingly complex variations.

Figure 9:
FIG. 9 is a top plan view of an embodiment of an intermediate level basic percussion exercise devised for the present invention.
Figure 9:
Figure 9:
Figure 9:
Figure 9:
Figure 9:

FIG. 9 illustrates an intermediate level basic percussion exercise devised for the present invention.

Figure 10:
FIG. 10 is a top plan view of a first transparent overlay as shown in FIG. 5 superimposed upon the opaque sheet of the intermediate level basic percussion exercise of FIG. 9.

FIG. 10 illustrates the transparent overlay 30 of FIG. 5 superimposed upon the intermediate level basic percussion exercise 26 of FIG. 9.

Figure 11:
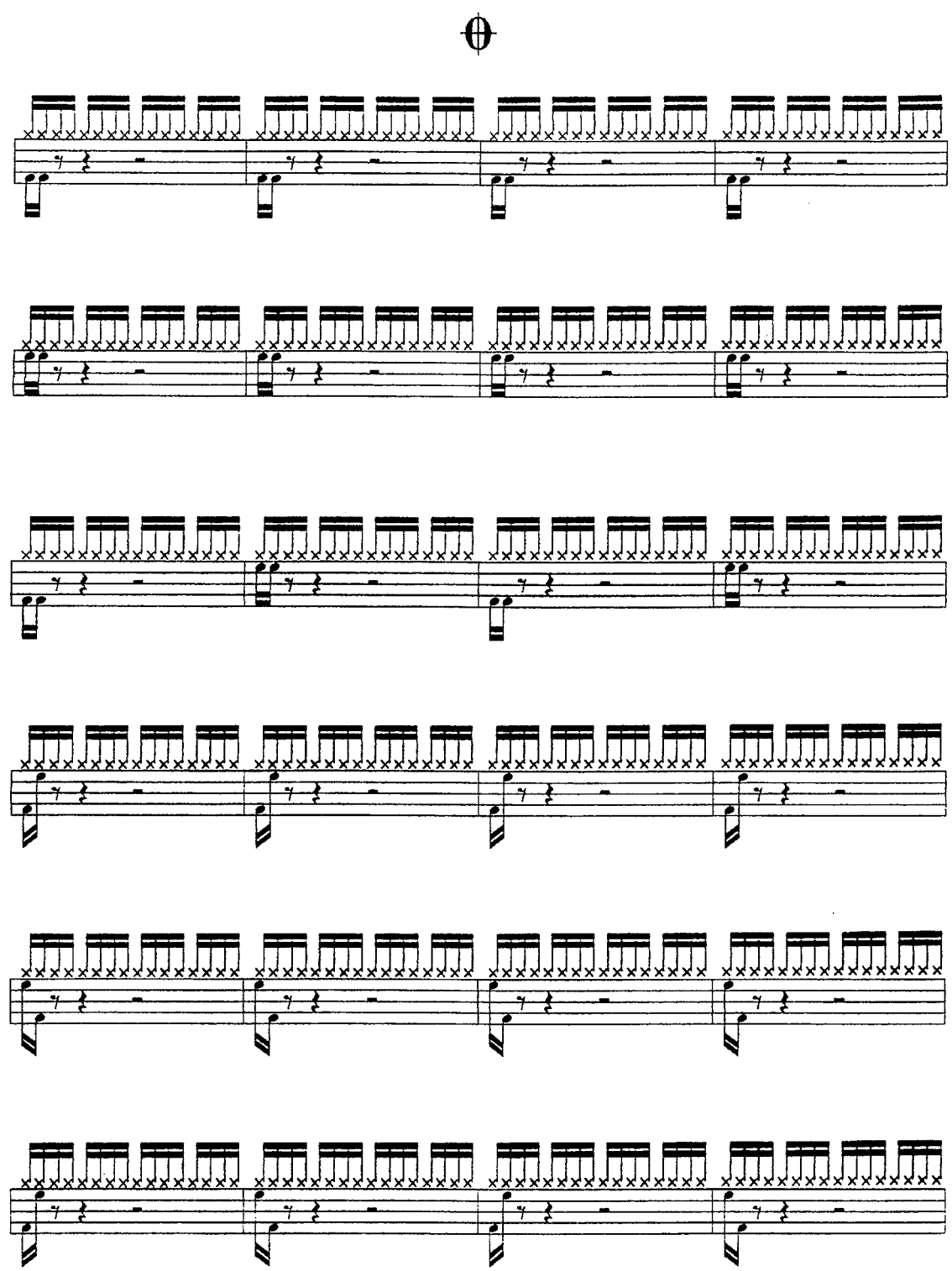
FIG. 11 is a top plan view of a second transparent overlay as shown in FIG. 7 superimposed upon the opaque sheet of the intermediate level basic percussion exercise of FIG. 9.

In similar fashion FIG. 11 illustrates the transparent overlay 30' of FIG. 7 superimposed upon the intermediate level basic percussion exercise 26 of FIG. 9.

By alternately superimposing the entire series of 15 different transparent overlays 30 in combination with the approximately 200 pages of percussion exercises 26 arranged in order of increasing complexity within volume 27 of the present invention, the percussion student may practice a devised sequence of percussion exercises necessary to the development of coordination and sight reading ability, which are requisite to the percussionist's art.

Further, the transparent overlays 30, which are constructed of resilient plastic materials well-known in the prior art, may be marked on, as with a felt pen, at the discretion of the user. In this way additional dynamic markings or accents in combination with percussion music indicia 31 already appearing on the transparent overlays 30 may be inserted to enhance the teaching process.

It is understood that the present invention may be carried out by computer and that the step of superimposing an overlay including percussion music indicia onto a preprinted basic percussion exercise may be incorporated into computer software as is hereinafter specifically claimed.

From the above it can be seen that the present invention provides an improved percussion music teaching method including a comprehensive selection of percussion music exercises for the student, which is reasonable in size by the use of a series of overlays. The series of overlays is designed to function in combination with a set of basic exercises printed on music display media to generate multiple hybrid variations of each basic percussion exercise, which would otherwise be impractical to publish and market.

The terms "upper", "lower", "side", "top", "bottom" and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A method of teaching percussion music comprising:

selecting a plurality of basic percussion music exercises including percussion music indicia for at least one percussion instrument;

printing said basic percussion music exercises on music display means;

devising a plurality of complimentary percussion music exercises including percussion music indicia for at least one different percussion music instrument;

applying said complimentary percussion exercises onto a plurality of overlays; and superimposing said overlays including said complimentary percussion exercises in alignment with said music display means having said basic percussion exercises printed thereon whereby said complimentary percussion music exercises are positioned in a functional relationship with said basic percussion exercises forming hybrid percussion exercises.

2. The method of claim 1 wherein the step of superimposing further comprises:

alternating each of said plurality of overlays in a devised sequence in combination with each of said basic percussion exercises whereby a number of hybrid percussion exercises are generated from each of said basic percussion exercises that is equal to the number of overlays alternately superimposed thereon.

3. The method of claim 1 where the step of selecting further comprises;

arranging said basic percussion exercises in a devised sequence.

4. The method of claim 1 wherein the step of printing further comprises:

producing a first locating mark on said plurality of said basic percussion exercises at a predetermined position whereby said overlays may be readily aligned thereto;

laying out said basic percussion exercises in precise spacial relation to said first locating mark whereby said complementary percussion music exercises on said overlays may be superimposed in said functional relationship; and binding said basic percussion exercises in book form.

5. The method of claim 1 wherein the step of applying further comprises:

producing a second locating mark on said plurality of said overlays at a predetermined position whereby said basic percussion exercises may be readily aligned thereto; and laying out said complimentary percussion music exercises in precise spacial relation to said second locating mark whereby said basic percussion music exercises on said music display means may be positioned in said functional relationship.

6. The method of claim 2 wherein the step of superimposing is carried out by computer means.

7. The method of claim 4 wherein the step of printing is carried out by computer means.

8. The method of claim 5 wherein the step of applying is carried out by computer means.

\* \* \* \* \*